Oct. 3, 1967    B. LEVY    3,345,279

PRODUCTION OF HYDRAZINE

Filed Jan. 16, 1963

INVENTOR.
BORIS LEVY
BY A. H. Caser
ATTORNEY

United States Patent Office 3,345,279
Patented Oct. 3, 1967

3,345,279
PRODUCTION OF HYDRAZINE
Boris Levy, Crosswicks, N.J., assignor to Mobil Oil Corporation, a corporation of New York
Filed Jan. 16, 1963, Ser. No. 251,799
4 Claims. (Cl. 204—157.1)

This invention relates to a method for making hydrazine by irradiating liquid ammonia at lower temperatures. As shown by Levy et al. in Nucleonics, 18, 128, 130, September 1960, liquid phase irradiation of ammonia at low temperatures results in higher yields, on the order of 30 times greater, than liquid phase irradiation at room temperatures.

The invention is particularly characterized by the fact that ammonia is not only the reactant but also the means for attaining the low temperatures at which irradiation is carried out.

The method generally comprises flowing a stream of liquid ammonia to an irradiation zone and another stream of liquid ammonia to an expansion zone which is maintained in indirect heat exchange with the irradiation zone. The ammonia in the expansion zone is expanded to vaporize the same, thus reducing the temperature of the liquid in the irradiation zone by indirect heat exchange, preferably to less than −70° C. This cold liquid is irradiated to convert at least a portion of the ammonia to liquid hydrazine, and the resulting mixture comprising hydrazine and unreacted ammonia is then removed and added to the stream entering the expansion zone where the ammonia is separated from the hydrazine by the expansion which takes place, and the hydrazine is rapidly withdrawn from the zone.

The reaction may be better understood by referring to the drawings, which are diagrammatic, and wherein FIG. 1 illustrates a flow scheme using a source of radiation which is outside of the irradiation zone;

Figure 1:
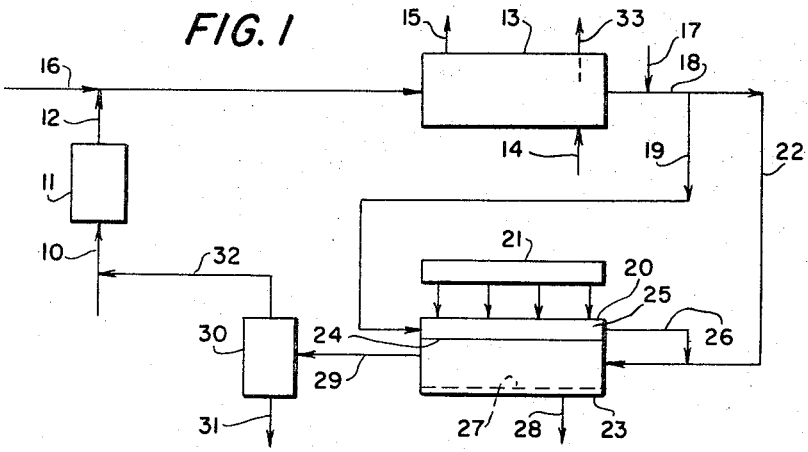
Figure 3:
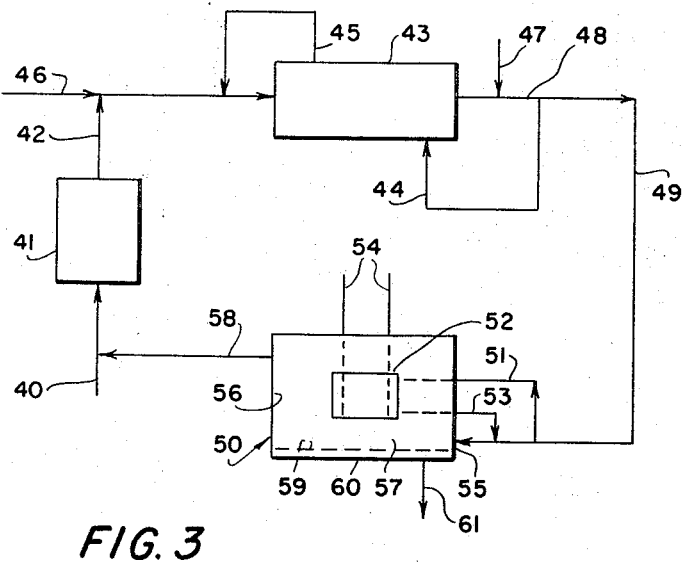
FIG. 3 is a flow scheme showing a source of radiation inside the irradiation zone.

In FIG. 1, gaseous ammonia entering the system by line 10 is introduced to compressor 11 where it is compressed and then passed by line 12 to cooler 13 and liquefied. Cooling may be accomplished by means of cold air or cold water entering the cooler by line 14 and leaving by line 15, using indirect heat exchange, or by using liquid ammonia in place of air or water, as illustrated in FIG. 3. If liquid ammonia is initially available, it may be introduced to the system by line 16 or 17 instead of line 10.

Liquid ammonia leaving cooler 13 is generally at a temperature higher than desired for the irradiation, and it is therefore further cooled in the following way. A portion of the stream in line 18 is sent by line 19 to irradiation zone 20 where it is held for a time while being irradiated by the source 21. Meanwhile, another stream is sent by line 22 to expansion zone 23 which is separated from zone 20 by a heat conducting wall 24. As the ammonia enters zone 23, it is expanded, owing to its introduction into a larger space of lower pressure, and the resultant cooling effect on the ammonia 25 on wall 24 in zone 20 serves to reduce the temperature of the latter ammonia to a desired range. The magnitude of the cooling effect is sufficient to reduce the temperature of the ammonia in zone 20 to at least as low as −60° C., and more preferably to a temperature in the range of −70 to −77° C., or just above the freezing point, and in consequence a relatively good conversion of ammonia to hydrazine is secured.

After a suitable irradiation interval, the irradiation mixture, comprising hydrazine, unreacted ammonia, and any gaseous reaction products like nitrogen and hydrogen, is delivered by line 26 to the stream in line 22 which enters the expansion zone 23. As expansion occurs in the latter zone, liquid hydrazine 27 collects on the floor of the zone and is removed through line 28. Gaseous material, comprising unreacted ammonia together with any nitrogen and hydrogen, are removed through line 29. It will be understod that all of the ammonia vaporizes in zone 23, whereas the hydrazine remains in the liquid phase, and in this way a separation is effected. The gaseous material in line 29 is passed to separator 30 where any entrained hydrazine is separated and removed by line 31, and the gaseous stream is sent through line 32 to be combined with the material flowing in line 10. However, if separation of hydrazine is complete in zone 23, separator 30 will not be required.

In order to prevent back reactions of the hydrazine with ammonia or with radiolytic products, and to prevent decomposition of the hydrazine, it is well to remove the latter from the system as rapidly as possible, and this may be done by means of the tap-off line 28 disposed in the lower portion of zone 23 and the line 31 in separator 30.

Accumulation of nitrogen and hydrogen in the system may be removed, as through line 33 in cooling zone 13 where liquefaction of the ammonia is accomplished. These products are valuable per se, and may also be combined to form ammonia by means of radiation. Thus, they may be passed through irradiation zone 20 while suitably enclosed in a pipe or tubular reactor, and the ammonia product, after separation of unchanged reactants, added to line 10.

High energy ionizing radiation of any type and from any suitable source may be used to irradiate. Such radiation is intended to embrace both ionizing particle radiation and ionizing electromagnetic radiation; the former includes accelerated electrons, nuclear particles like protons, fast neutrons, alpha and beta particles, deuterons, fission fragments, and the like; and the latter includes gamma rays and X-rays. Gamma rays are a convenient and practical penetrating radiation.

The foregoing types of radiation may be obtained from various sources, including natural radioactive materials, which emit alpha, beta, and gamma radiation; from nuclear fisssion byproducts of processes in which atomic power is generated, these by-products including elements having atomic numbers ranging from 30 to 63; from materials made radioactive by exposure to neutron radiation, such as cobalt-60, cesium-37, sodium-24, manganese-56, gadolinium-72, lanthanum-140, etc.; or from operating nuclear reactors. The charged particles may be brought to high energy levels by acceleration in devices like cathode ray tubes, Van de Graaff generators, betatrons, synchrotrons, cyclotrons, and electron accelerators. High energy X-ray machines are a source of X-rays.

A practically useful energy level for the foregoing types of radiation is 1 mev., although the level may range from 1 kev. to 20 or 30 mev. It will be understood that the invention is not dependent on the energy level of the radiation, which may be as low as is effective and as high as desired.

The radiation dose applied to the ammonia is variable, ranging from that amount which will produce a chemical conversion, to any desired greater amount. Numerically, the dose may range from 0.0001 to 1,000, preferably 0.01 to 100 megarads. As an example, a useful dose rate is about 1 megarad/hour, although this value may be increased or decreased by several orders of magnitude with corresponding changes in the time of irradiation. A typical range of dose rate is 0.1 to 10 megarads/hour, and a more general range is 0.01 to one thousand or one million megarads/hour.

As described, irradiation is done with ammonia in the liquid phase. Hydrazine yields are improved as the temperature of the liquid ammonia is decreased, and for this reason temperatures of −60 to −77° C. are preferred, more preferably −70 to −77° C. The time of irradiation may extend from 1 second to several hours, preferably 1 second to about 1000 seconds, depending on the intensity of radiation and on the ionization density. Shorter times are preferred with increasing radiation intensity and increasing ionization density.

The method of FIG. 1 is suitable when irradiating with alpha, beta, and gamma radiation, electrons, protons, etc. When it is desired to irradiate with fission fragments, the modifications of FIG. 2 or 3 may be used.

Figure 2:
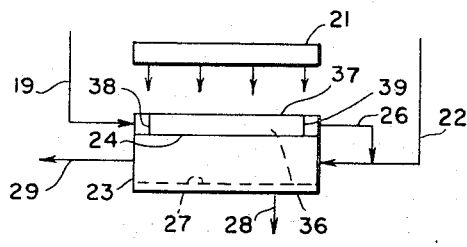
FIG. 2 is a modification illustrating radiation sources partly outside and partly inside the irradiation zone.

In FIG. 2, a quantity 36 of fissionable material is suitably enclosed in an elongated container 37 having porous end walls 38 and 39, with the container disposed on wall 24. The fissionable material may be uranium-235, or uranium-233, or plutonium-239, in elemental form or as a compound like the oxide or carbide. Natural uranium may also be used provided it is suitably enriched. Physically, the fissionable material may be in the form of small spheres, or particles of other shapes, of a diameter ranging from less than 1 to 20 or 30 or more microns. The particles may be in the form of a bed which is held or supported within container 37 and through which the ammonia may flow but which retains the particles. Thus, the particles are relatively stationary as the ammonia flows through them. It will be understood that the hydrazine product resulting from this procedure is to be decontaminated, using procedures like ion exchange distillation, etc. Contamination of the product by normally solid fission fragments may be materially reduced if not avoided by making up the particles of fissionable material, together with an inert carrier, in the form of, say, beads or pellets comprising a porous outer shell portion surrounding a porous inner core portion. The core portion may contain all the fissionable material while the shell portion is substantially free of fissionable material and is of sufficient thickness to substantially prevent the escape therethrough of normally solid fission products. Such beads are described in U.S. Patent 3,228,-848, Ser. No. 24,123, filed Apr. 22, 1960.

Radiation source 21 may comprise any conventional source of neutrons, such as a mixture of radium and beryllium, or a nuclear reactor, and these neutrons activate the fissionable material 36 so that fission occurs to produce fission fragments as well as other nuclear radiation, by means of which the conversion of ammonia to hydrazine is induced. The amount of fissionable material is sufficient to produce a neutron-multiplying but not a self-sustaining fission reaction. It will be understood that suitable shielding will be provided. An illustrative system useful for this modification is shown in FIG. 1 of the above noted copending case, wherein a chemonuclear reactor is disposed within the core of a nuclear reactor.

In other respects the modification of FIG. 2 is like FIG. 1, as may be seen from the use of like reference numerals, and need not be described.

In FIG. 3, fission fragments and neutrons are also used to irradiate, but in this case the fission reaction is a neutron-multiplying self-sustaining one. As shown, gaseous ammonia flowing in line 40 is compressed in compressor 41 and passed by line 42 to cooler 43 where it is liquefied, using as coolant a portion of previously liquefied ammonia drawn from outlet line 48 and passed through line 44 in indirect heat exchange with the ammonia in zone 43. The coolant leaves zone 43 by line 45 and is combined with the inlet stream in line 42.

If liquefied rather than gaseous ammonia is available, it may be introduced to the system through lines 46 or 47.

Liquefied ammonia in line 48 is then sent by line 49 to the chemonuclear reactor 50 to be irradiated. More particularly, a portion of the liquid in line 49 is diverted into line 51 by which it is introduced to the core 52 of the reactor where it receives nuclear radiation sufficient to effect a conversion of at least part of the ammonia to hydrazine. The mixture is then removed through line 53. The core 52 is suitably provided with conventional control rods 54 and moderator (not shown). Irradiated ammonia in line 53 is combined with the stream in line 49 and introduced through shield 55 to the space 56 surrounding the core where it may act as a reflector 57. Expansion of the ammonia in space 56 is induced, the resulting vapors being withdrawn through line 58 to line 40 for recycling, and the liquid hydrazine 59 collecting on the floor 60 being removed by line 61.

The fuel in the core 52 may be the same as that in zone 37, already described, except that the amount is sufficient to support a self-sustaining fission reaction. Generally at least 0.8% of the fuel should comprise U-235, U-233, or Pu-239 as the fissionable material. By "fissionable material" is meant those materials which undergo nuclear fission as a result of the absorption of thermal neutrons. It will be understood that additional layers of reflector and shield materials may be provided as desired and that these may be of conventional materials. Also, a separator such as unit 30 of FIG. 1 may be placed in line 58.

Relatively good yields of hydrazine, with G values in excess of 0.2, are obtainable, G representing the number of hydrazine molecules per 100 electron volts.

While batch irradiation may be carried out, it is preferred to operate with a continuously flowing system as this tends to minimize decomposition of the hydrazine. In this connection, it will be understood that the drawings are quite diagrammatic and that suitable valves, pumps, meters, and other necessary equipment will be provided as required.

In a typical operation based on the flow of FIG. 1, liquid ammonia in an amount of 1000 g./hr. is passed to an irradiation zone such as zone 20 containing cobalt-60 as the radiation source. At the same time, a quantity of liquid ammonia is passed to an expansion zone, such as zone 23, in an amount and rate sufficient, upon expansion of the same, to reduce the temperature of the ammonia in the irradiation zone to a value of about −60° C. Over a period of an hour the ammonia is irradiated at a dose rate of 10,000 megarads/hour. The yield of hydrazine is about 0.660 g./hr./g. of liquid ammonia, or about 660 g./hr./1000 g. ammonia. This corresponds to a G value of about 2. Other major products are hydrogen (G of 1) and nitrogen (G of 0.3), in yields of about 21 and 89 g./hr./1000 g. liquid ammonia, respectively.

It will be understood that the invention is capable of obvious variations without departing from its scope.

In the light of the foregoing descriptions, the following is claimed.

I claim:

1. Method of making hydrazine continuously from ammonia gas which comprises compressing and cooling said gas to the liquid state, flowing a part of the liquid to an irradiation zone and another part to an expansion zone in heat exchange relation with said irradiation zone, expanding the liquid in the expansion zone, thereby to reduce the temperature of the liquid in the irradiation zone by heat exchange to about −70 to −77° C., irradiating the liquid in the irradiation zone with ionizing radiation at said temperature to convert at least a portion of the ammonia to liquid hydrazine, flowing the irradiated material to join the liquid ammonia stream passing to said expansion zone, said expansion step in the latter zone acting to vaporize liquid ammonia, including unreacted liquid ammonia, and gaseous irradiation products away from the liquid hydrazine, collecting the latter at the bottom of the expansion zone and rapidly removing the same, flowing said vaporized ammonia and gaseous irradiated products to said compressing and cooling steps to form liquid ammonia, bleeding off gaseous irradiation products from time to time in said cooling step, and flowing the liquid ammonia to said irradiation and expansion zone as described.

2. Method of making hydrazine continuously from ammonia which comprises flowing a stream of liquid ammonia to an irradiation zone and another stream to an expansion zone maintained in heat exchange relation therewith, expanding the liquid in the expansion zone, thereby to reduce the temperature of the liquid in the irradiation zone by heat exchange to less than about −60° C., irradiating the liquid in the irradiation zone with ionizing radiation at said temperature to convert at least a portion of the ammonia to liquid hydrazine, flowing the irradiated material to join the liquid ammonia stream passing to said expansion zone, said expansion step in the latter zone acting to vaporize liquid ammonia, including unreacted liquid ammonia, away from the liquid hydrazine, collecting the latter in the expansion zone and rapidly removing the same.

3. Method of making hydrazine from ammonia which comprises irradiating a first portion of liquid ammonia with ionizing radiation to convert at least a part thereof to hydrazine, coincidently therewith expanding another portion of liquid ammonia in heat exchange relation with said first portion to thereby reduce the temperature of the portion undergoing irradiation to a temperature in the range of −60° C. to the freezing point, combining the irradiated portion with the expanding portion so that both portions undergo expansion, removing vaporized ammonia from said expanding portions to thereby separate the ammonia from liquid hydrazine, and recovering said separated hydrazine as product.

4. Method of making hydrazine from ammonia which comprises irradiating a first portion of liquid ammonia with ionizing radiation to convert at least a part thereof to hydrazine, coincidently therewith expanding a previously irradiated portion of liquid ammonia while in heat exchange relation with said first portion to cool said first portion during said irradiation step, removing vaporized ammonia from said expanded portion, thus separating the ammonia from liquid hydrazine product, and recovering said separated hydrazine.

References Cited
UNITED STATES PATENTS 2,704,274    3/1955    Allison _____ 204—176

OTHER REFERENCES

Levy et al.: Nucleonics, volume 18, (September 1960), pages 128, 130.

HOWARD S. WILLIAMS, *Primary Examiner.*

MURRAY TILLMAN, JOHN H. MACK, *Examiners.*